United States Patent
Long et al.

(10) Patent No.: US 10,780,853 B2
(45) Date of Patent: Sep. 22, 2020

(54) EXTERNAL LUBE SYSTEM FOR A TRANSMISSION

(71) Applicant: Allison Transmission, Inc., Indianapolis, IN (US)

(72) Inventors: Charles F. Long, Pittsboro, IN (US); Richard H. Price, Greenwood, IN (US)

(73) Assignee: ALLISON TRANSMISSION, INC., Indianapolis, TN (US)

(*) Notice: Subject to any disclaimer, the term of this patent is extended or adjusted under 35 U.S.C. 154(b) by 413 days.

(21) Appl. No.: 13/632,198

(22) Filed: Oct. 1, 2012

(65) Prior Publication Data
US 2014/0091023 A1    Apr. 3, 2014

(51) Int. Cl.
| | |
|---|---|
| *B60R 17/02* | (2006.01) |
| *F16N 7/36* | (2006.01) |
| *F16H 57/04* | (2010.01) |
| *F16N 9/00* | (2006.01) |

(Continued)

(52) U.S. Cl.
CPC ........... *B60R 17/02* (2013.01); *F16H 57/042* (2013.01); *F16H 57/0404* (2013.01); *F16H 57/0436* (2013.01); *F16H 57/0441* (2013.01); *F16H 57/0442* (2013.01); *F16H 57/0484* (2013.01);

(Continued)

(58) Field of Classification Search
None
See application file for complete search history.

(56) References Cited

U.S. PATENT DOCUMENTS

| 4,106,367 A | 8/1978 | Bouvet |
| 5,555,727 A * | 9/1996 | Hauser ............... B60K 17/105 |
| | | 60/455 |

(Continued)

FOREIGN PATENT DOCUMENTS

| DE | 3709626 A1 | 10/1988 |
| DE | 102006012838 | 11/2006 |

(Continued)

OTHER PUBLICATIONS

ISA/KR (KIPO): "Notification of Transmittal of the International Search Report and the Written Opinion of the International Searching Authority, or the Declaration"; dated Nov. 21, 2013; pp. 1-12.

(Continued)

*Primary Examiner* — Robert J Popovics
(74) *Attorney, Agent, or Firm* — Taft Stettinius & Hollister LLP; Stephen F. Rost

(57) ABSTRACT

The present disclosure is related to a transmission for a powered vehicle. The transmission includes a housing defining an interior of the transmission and a fluid supply portion disposed in the housing. The fluid supply portion is configured to supply fluid throughout the transmission. The transmission also includes a first fluid circuit disposed within the housing and defining a first fluid path in fluid communication with the fluid supply portion. A second fluid circuit fluidly defines a second fluid path in fluid communication with the fluid supply portion. The transmission further includes a coupling mechanism for fluidly coupling the first fluid circuit and second fluid circuit, wherein the second fluid circuit is disposed outside the housing of the transmission.

14 Claims, 3 Drawing Sheets

(51) Int. Cl.
*F16N 7/40* (2006.01)
*F16N 39/06* (2006.01)

(52) U.S. Cl.
CPC ............... *F16N 7/36* (2013.01); *F16N 7/40* (2013.01); *F16N 9/00* (2013.01); *F16N 39/06* (2013.01)

(56) References Cited

U.S. PATENT DOCUMENTS

| | | | | |
|---|---|---|---|---|
| 6,066,060 | A * | 5/2000 | Harper | F16H 57/0434 184/10 |
| 6,374,872 | B1 * | 4/2002 | Tarabocchia | F16H 57/0408 141/65 |
| 6,752,181 | B1 * | 6/2004 | Awad | F16H 57/0408 141/1 |
| 6,805,647 | B2 * | 10/2004 | Silveri | B60K 6/48 475/122 |
| 6,997,238 | B1 * | 2/2006 | Ruthy | F16H 57/0417 165/41 |
| 7,114,482 | B2 * | 10/2006 | Lane | F01M 1/02 123/196 R |
| 7,232,402 | B2 * | 6/2007 | Tryon | F16D 25/0638 192/106 F |
| 7,516,807 | B2 * | 4/2009 | Carlson | B60K 25/00 180/165 |
| 7,695,250 | B2 * | 4/2010 | Johnson | F04C 11/00 184/6.3 |
| 8,068,966 | B2 * | 11/2011 | Wu | B60K 6/547 701/60 |
| 8,251,851 | B2 * | 8/2012 | Beattie, Jr. | F16H 61/0031 180/339 |
| 8,486,277 | B1 * | 7/2013 | Nader | B01D 35/147 184/6.24 |
| 8,522,913 | B2 * | 9/2013 | Mussoi | F16H 61/0009 137/565.31 |
| 8,764,596 | B2 * | 7/2014 | Tryon | F16H 61/0031 475/78 |
| 9,206,895 | B2 * | 12/2015 | Frait | F16H 61/0009 |
| 9,650,925 | B2 * | 5/2017 | Free | F01M 1/16 |
| 9,683,573 | B2 * | 6/2017 | Kagawa | F04B 49/06 |
| 10,232,291 | B2 * | 3/2019 | Dziurda | F16H 57/0404 |
| 2001/0003899 | A1 * | 6/2001 | Smothers | F16H 61/4139 60/487 |
| 2001/0047907 | A1 * | 12/2001 | Viken | F16H 57/0408 184/1.5 |
| 2007/0000728 | A1 | 1/2007 | Pignard | |
| 2007/0098567 | A1 * | 5/2007 | Johnson | F04C 11/00 417/199.1 |
| 2008/0279701 | A1 | 11/2008 | Irwin | |
| 2008/0310972 | A1 | 12/2008 | Dong et al. | |
| 2009/0057062 | A1 * | 3/2009 | Eschenbeck | F16H 61/0031 184/6.28 |
| 2009/0203497 | A1 * | 8/2009 | Imediegwu | B60W 20/10 477/5 |
| 2009/0257887 | A1 * | 10/2009 | Beattie, Jr. | F16H 61/0031 417/14 |
| 2011/0259450 | A1 * | 10/2011 | Mussoi | F16H 61/0009 137/544 |
| 2012/0011961 | A1 * | 1/2012 | Frait | F16H 61/0009 74/606 R |
| 2014/0091023 | A1 * | 4/2014 | Long | F16H 57/0441 210/167.08 |
| 2014/0116963 | A1 * | 5/2014 | Dziurda | B01D 35/005 210/767 |

FOREIGN PATENT DOCUMENTS

| | | |
|---|---|---|
| JP | 2005098338 A | 4/2005 |
| JP | 2012042007 A | 3/2012 |
| WO | 2012112778 | 8/2012 |

OTHER PUBLICATIONS

European Search Report, dated Apr. 29, 2016, 7 pgs.
European Examination Report, European Patent Office, European Patent Application No. 13844174.6, dated Nov. 4, 2019, 6 pages.
Korean Office Action, Korean Intellectual Property Office, Korean Patent Application No. 10-2015-7008786, dated Jul. 8, 2019, 6 pages.
Korean Office Action, Korean Intellectual Property Office, Korean Patent Application No. 10-2015-7008786, dated Jan. 20, 2020, 5 pages.

* cited by examiner

EXTERNAL LUBE SYSTEM FOR A TRANSMISSION

FIELD OF THE INVENTION

The present invention relates to a transmission, and in particular to a lube circuit for a transmission.

BACKGROUND

A conventional powered vehicle may include a drive mechanism coupled to a transmission system to form the vehicle's powertrain. The drive mechanism can be an electric motor, an internal combustion engine, or other power-generating device. A conventional transmission system can incorporate an internal lube system for providing oil or other fluid throughout the interior of the transmission. The lube system is important to achieve hydraulic pressures for lubricating, and cooling different components (e.g., shafts, clutch plates, etc.) during transmission operation. In some conventional systems, the internal lube system can include a pump disposed within an outer housing of the transmission. The pump can be driven, for example, to build pressure within the transmission. In one instance, the internal pump provides oil to a torque converter, cooler circuit, lube circuit, and a main oil pressure circuit within the transmission.

When the internal pump is not working or being driven by the drive mechanism, there is no means for lubricating the internal components of the transmission. Therefore, the transmission is typically disconnected from the vehicle's rear axle when towing the vehicle. Similarly, in train applications, two or more train locomotives can be coupled to one another such that only one of the locomotives drives the train. The powertrain of the other locomotive(s) is disconnected to avoid possible damage to the internal components of the transmission as it is towed.

It would be desirable, however, to be able to lubricate the transmission even when the drive mechanism is not driving the internal pump. It would be further desirable to provide an external lube circuit to lubricate the internal components of the transmission when the internal lube circuit is not functional.

SUMMARY

In a first exemplary embodiment of the present disclosure, a transmission is provided for a powered vehicle. The transmission includes a housing defining an interior of the transmission and a fluid supply portion disposed in the housing. The fluid supply portion is configured to supply fluid throughout the transmission. The transmission also includes a first fluid circuit disposed within the housing and defining a first fluid path in fluid communication with the fluid supply portion. A second fluid circuit fluidly defines a second fluid path in fluid communication with the fluid supply portion. The transmission further includes a coupling mechanism for fluidly coupling the first fluid circuit and second fluid circuit, wherein the second fluid circuit is disposed outside the housing of the transmission.

In one aspect of this embodiment, the coupling mechanism comprises a manifold coupled to the housing. In a different aspect, the coupling mechanism comprises a pressure tap. In a further aspect, the second fluid circuit comprises a power device disposed outside the housing, a pump operably coupled to the power device, the pump having an inlet and an outlet, a first flow tube coupled to the pump inlet, the first flow tube fluidly coupling the fluid supply portion to the inlet, a second flow tube coupled to the pump outlet, the second flow tube fluidly coupling the coupling mechanism to the pump outlet, wherein the pump is adapted to pump fluid from the fluid supply portion through the second fluid path to the coupling mechanism. In yet a further aspect, the power device is an electric motor and hydraulic pump.

In a more detailed aspect, the transmission can include a bracket for mounting the pump to the housing. Also, a valve can be disposed between the pump and coupling mechanism, the valve configured to prevent a reverse flow of fluid in the second flow tube. Moreover, the transmission can include a filter disposed between the fluid supply portion and the pump. In yet a further detailed aspect, the transmission can include a second pump disposed in the housing, where the second pump is inoperable when the first pump is operable. Related thereto, the first pump and second pump are operable at the same time.

In an alternative aspect, the transmission includes a cooler filter disposed in the housing and in fluid communication with the first fluid circuit, wherein the second fluid circuit is fluidly coupled to the first fluid circuit before the filter. In a different aspect, the transmission can include a cooler filter disposed in the housing and in fluid communication with the first fluid circuit, wherein the second fluid circuit is fluidly coupled to the first fluid circuit after the filter. The transmission can further include a lube regulator valve disposed in the housing and being in fluid communication with the first and second fluid circuits, where the lube regulator valve is configured to regulate lube pressure in the transmission.

In another exemplary embodiment, an external lube circuit kit is provided for mounting to an exterior portion of a transmission. The transmission can have an outer housing, a fluid supply disposed in the housing, an internal pump fluidly coupled to the fluid supply, and an internal lube circuit defined in the housing and in fluid communication with the fluid supply and internal pump. The kit can include a drive unit and a pump operably coupled to the drive unit. The pump includes an inlet and an outlet. The kit also can include a first flow tube coupled to the pump inlet, where the first flow tube is adapted to fluidly couple the pump to the fluid supply and a second flow tube coupled to the pump outlet, where the second flow tube adapted to fluidly couple the pump to the internal lube circuit.

In one aspect, the kit can include a coupling mechanism for fluidly coupling the second flow tube to the internal lube circuit. In a related aspect, the coupling mechanism can include a manifold coupled to the housing, a pressure tap defined in the housing, or an orifice defined in a filter cover. In another aspect, the kit can include a bracket for coupling the pump to the exterior portion of the transmission. The kit can further include a filter disposed in the first flow tube between the fluid supply and pump or a valve disposed in the second flow tube between the pump and internal lube circuit. In a different aspect, the first flow tube couples to a channel plate or dipstick tube of the transmission.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
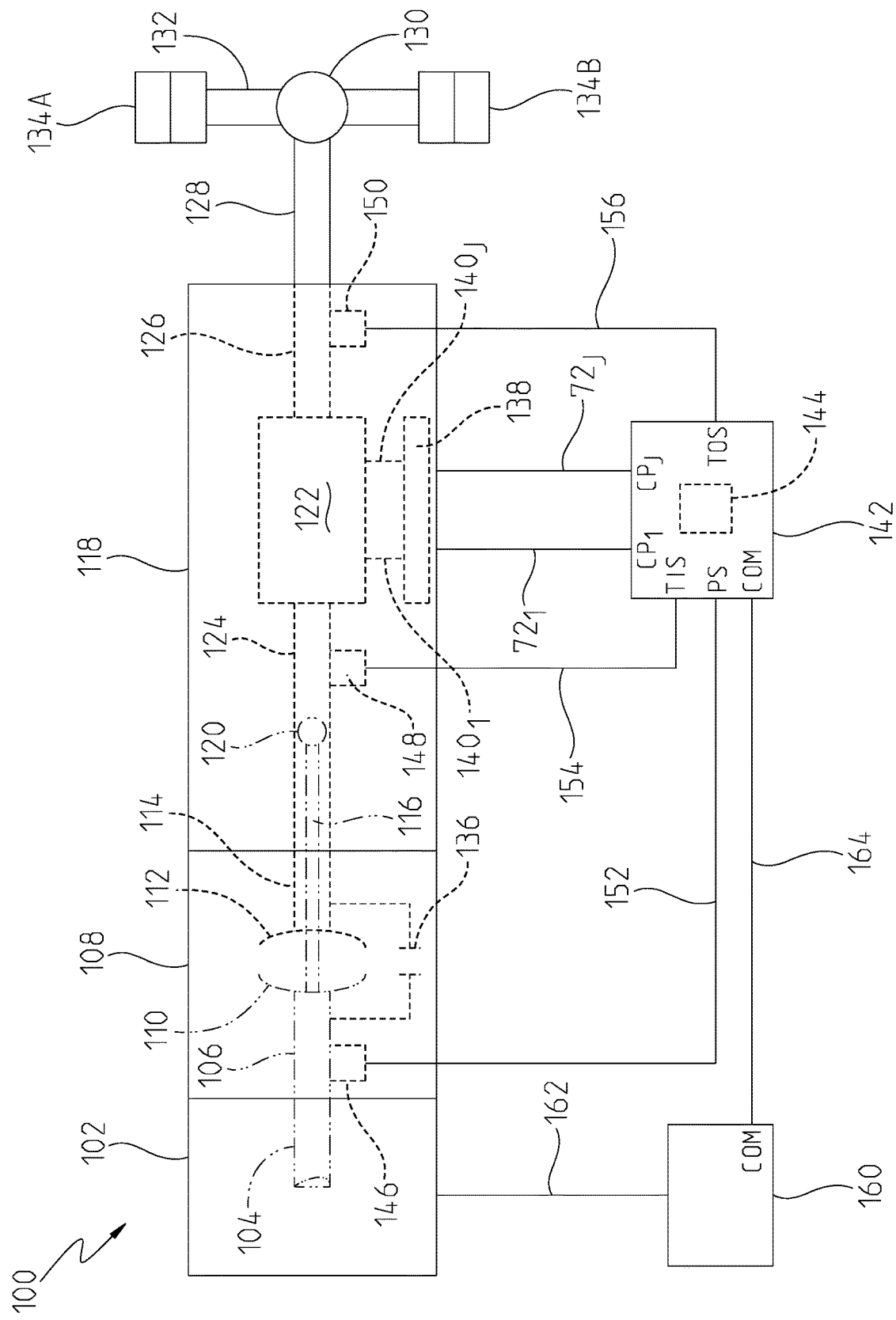
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_1$, and thus control the operation, i.e., engaging and disengaging, of one or more corresponding friction devices, based on information provided by the various speed sensors 146, 148, and/or 150. The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols.

As previously described, the drive unit 102 drives the internal pump 120 of the transmission 118. During operation, oil inside the transmission can be supplied by the internal pump 120 to a main oil circuit, the torque converter 108, a cooler, and an internal lube circuit. The internal pump 120, however, requires the drive unit 102 to be operating, and if the drive unit 102 is not operating, oil cannot be supplied to the main oil circuit, torque converter 108, cooler, or lube circuit. Without oil passing through the lube circuit, the connection between the transmission output shaft 126 and rear axle 132 must be disassembled if the vehicle 100 is towed. Otherwise, one or more components internal to the transmission 118 can be damaged due to a lack of lubrication.

In an exemplary embodiment of a solution to the problem in the art, a transmission may have an outer housing or case to protect components internal thereto. The transmission may be substantially similar to the transmission 118 of FIG. 1. A converter housing is mounted to a front end of the transmission housing and has a cavity in which the torque converter 108 resides. The transmission can include a manifold or body which at least partially encloses a portion of the electro-hydraulic system 138. A portion of the lube circuit can be disposed within the electro-hydraulic system 138. For instance, one or more flow channels or paths may be defined in the system 138. The electro-hydraulic system 138 can also define one or more channels that feed into the main circuit as well such that the lube circuit and main circuit can be in fluid communication in one or more configurations. For purposes of the present disclosure, a configuration may be a particular arrangement of valves, solenoids, and the like disposed within the transmission for achieving a desired transmission output.

The embodiment further includes a pump external to the transmission. The pump can be electric, hydraulic, mechanical or other known type of pump. The pump can be driven by an electric motor, for example, or other known driving mechanism. In addition, the pump is fluidly coupled to the lube circuit of the transmission via an external circuit. The external circuit can include a flow tube (e.g., flow line 342, 442 in FIGS. 2 and 3) that is fluidly coupled between the pump and transmission. For instance, a fitting can connect the flow tube to the manifold or body of the transmission in a location that is fluidly coupled to the lube circuit. A first fitting couples an outlet of the pump directly to the flow tube and a second fitting couples an inlet of the pump to a fluid supply of the transmission. In this disclosure, the fluid supply can be referred to as a "sump". This can be a reservoir, cavity or collection area in the transmission where fluid collects. In some instances, due to gravity, the fluid supply may be a fluid pan disposed near the bottom of the transmission.

In any case, the pump can be fluidly coupled to the fluid supply via the fitting. As such, the pump can draw fluid from the fluid supply through the pump inlet and pump the fluid through its outlet and into the flow tube. In this embodiment, the pump can effectively pump a desired amount or flow rate of fluid through the transmission lube circuit without requiring the drive unit 102 or engine from operating. In a related embodiment, the pump may also be configured to drive fluid through the transmission main circuit, lube circuit, torque converter, or cooler. In one aspect, the pump can be mounted directly to the transmission via its the outer housing. Here, a bracket can mechanically couple the pump to a mounting location of the transmission. In other aspects, the pump may be mounted to a vehicle such as a train.

The pump is externally mounted relative to the transmission. In an exemplary aspect, the external pump can operate at approximately 4 gallons per minute at 45 psi. The size and performance of the pump, however, can vary based on the system requirements. For instance, in one embodiment, both the internal pump 120 and external pump can operate simultaneously or at least partially simultaneously with one another. Here, a smaller external pump may be effective for delivering fluid throughout the transmission. Conversely, a smaller internal pump 120 may be provided due to space limitations within the transmission or the size of the transmission is smaller. In this instance, a larger external pump may be used to support the smaller internal pump 120. In a different embodiment, a transmission may not include an internal pump and only utilize an external pump to supply fluid throughout for desired performance. As such, the present disclosure is not limited to any size or performance requirement of either an internal or external pump to supply a fluid circuit of the transmission.

The external pump can be included as part of an external lube circuit kit. The kit can include tubing, fittings, and a bracket for mounting the pump to the transmission or alternative location. The kit can further include an electric motor or other mechanism to provide power to the pump. A channel plate (not shown) or tubing can also be provided in the kit to establish a fluid path from the transmission sump to the pump inlet. The tubing can be in the form of a dipstick tube, for example, or other known tubing means. The kit can also include a cast manifold that fluidly couples to the lube circuit of the transmission. The manifold can include a filter cover, a pressure tap, or other means for fluidly coupling the pump to the lube circuit. The manifold can also include a bracket or mounting location for coupling the external pump thereto. It can be desirable for the kit to require minimal hardware for fluidly coupling the external lube circuit to the internal lube circuit. Other kit hardware can include a filter (i.e., screen filter), check valve, etc. These features and other kit features will be described with respect to the illustrated embodiments of FIGS. 2 and 3.

Figure 2:
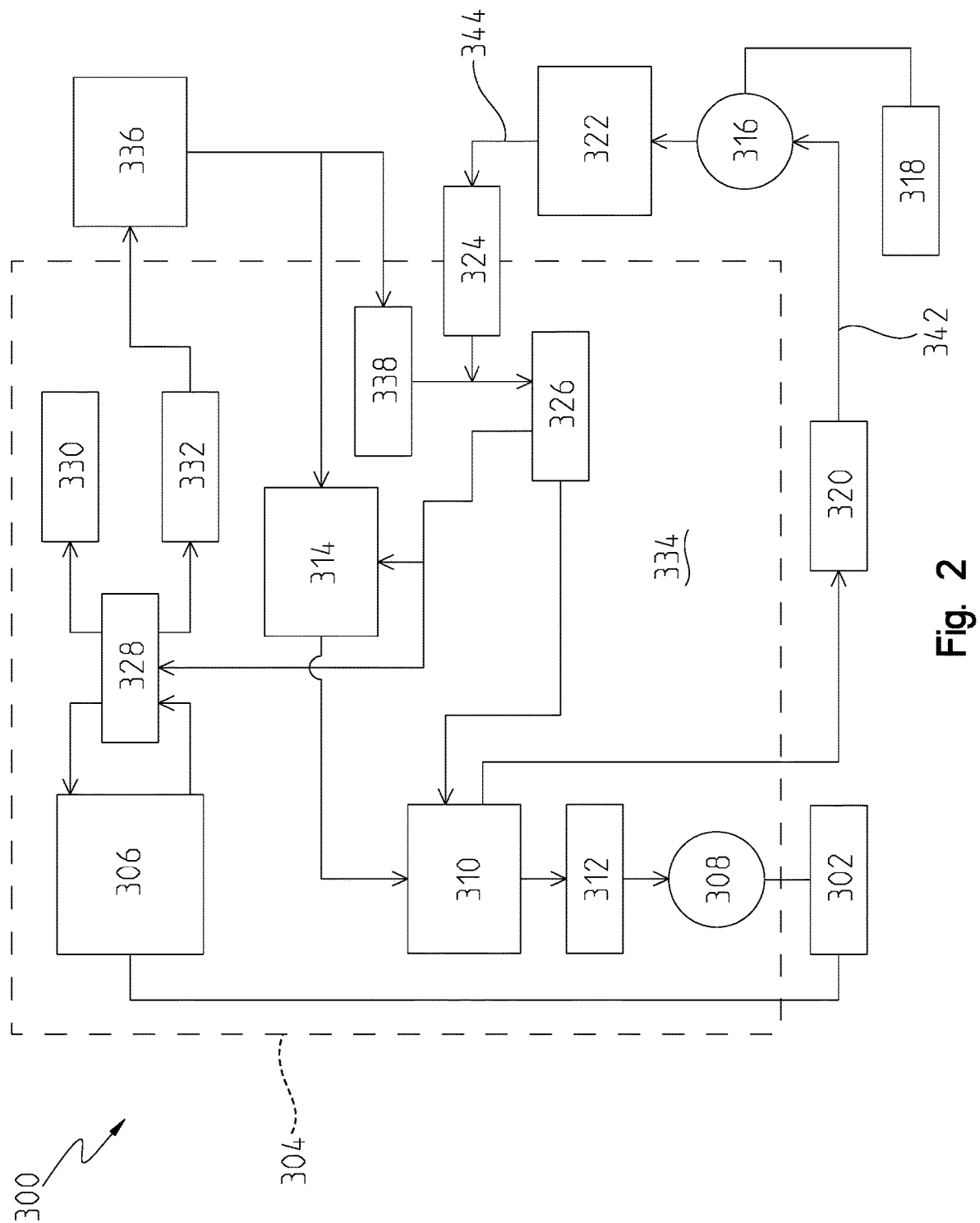
FIG. 2 is a first exemplary block diagram and schematic view of a lube circuit for a transmission.

In FIG. 2, an exemplary embodiment of a transmission lube system is shown. The system 300 is provided with a lube circuit that includes a first lube portion and a second lube portion. The first lube portion is defined within an interior 334 of the transmission 304. The interior 334 of the transmission 304 is represented by a dash line. In some aspects, the first lube portion can be any conventional lube system including a pump, valves, solenoids, etc. The second lube portion is fluidly coupled to the first lube portion, and the second lube portion is disposed outside the transmission.

The transmission 304 can include a torque converter 306 that receives power from an engine or other drive unit 302. The engine 302 can also operatively drive an internal pump 308 of the transmission 304. The internal pump 308 can form part of the first lube portion. As the internal pump 308 is driven, fluid from a transmission sump 310 can be suctioned through a filter 312 and into the pump 308. The internal pump 308 can then distribute the fluid throughout the transmission 304 to a main circuit, lube circuit, the converter 306 and external cooler 336. However, when the engine or drive unit 302 is not operating, the internal pump is not driven and therefore is unable to distribute fluid throughout the lube circuit.

To overcome this limitation, the system 300 includes an external pump 316 that forms part of the second lube portion. The external pump 316 can be an electric pump driven by an electric motor 318 as shown in FIG. 2. Alternatively, the pump 316 can be hydraulic, mechanical, or a combination thereof. As shown, the external pump 316 is disposed outside of the transmission 304. In one embodiment, the pump 316 can be mounted to a location on the transmission 304. In another embodiment, the pump 316 can be mounted to a structure other than the transmission 304. For instance, if the transmission 304 is disposed in a train, the pump 316 may be mounted to a railing or mounting location on the train.

Similar to the internal pump 308, the external pump 316 can be fluidly coupled to the transmission sump 310 via a first flow line 342. To do so, a flow tube or dipstick tube opening in the transmission 304 can be used to fluidly connect the sump 310 to the external pump 316. The transmission sump 310 therefore serves as a fluid supply to both pumps. A filter 320 may optionally be disposed between the external pump 316 and sump 310 to remove debris and other contaminants that might otherwise impact the performance of the pump 316. The filter 320 can be a 100 µm screen filter disposed in the suction line of the second portion of the lube circuit. The filter 320 is disposed on the pump inlet side, whereas a check valve 322 is disposed on the pump outlet side to prevent reverse flow of fluid. Fluid may be pumped from the external pump 316 through a second flow line 344 to the transmission 300.

The first lube portion and second lube portion are fluidly coupled to one another via a pressure tap 324 in the transmission 304. The pressure tap 324 is located such that a conventionally-sized orifice may be machined into the transmission housing and plumbing may coupled the pump outlet to the first lube portion. As shown by the arrows in FIG. 2, fluid that is pumped through the pressure tap 324 and into the transmission 304 flows to a lube regulator valve 326. The lube regulator valve 326 is operable to control fluid pressure in the lube circuit. Therefore, depending on the fluid pressure and other factors, the lube regulator valve 326 can open different fluid channels in the lube circuit. For instance, one such path directs fluid through the lube regulator valve 326 and returns fluid to the transmission sump 310.

Figure 3:
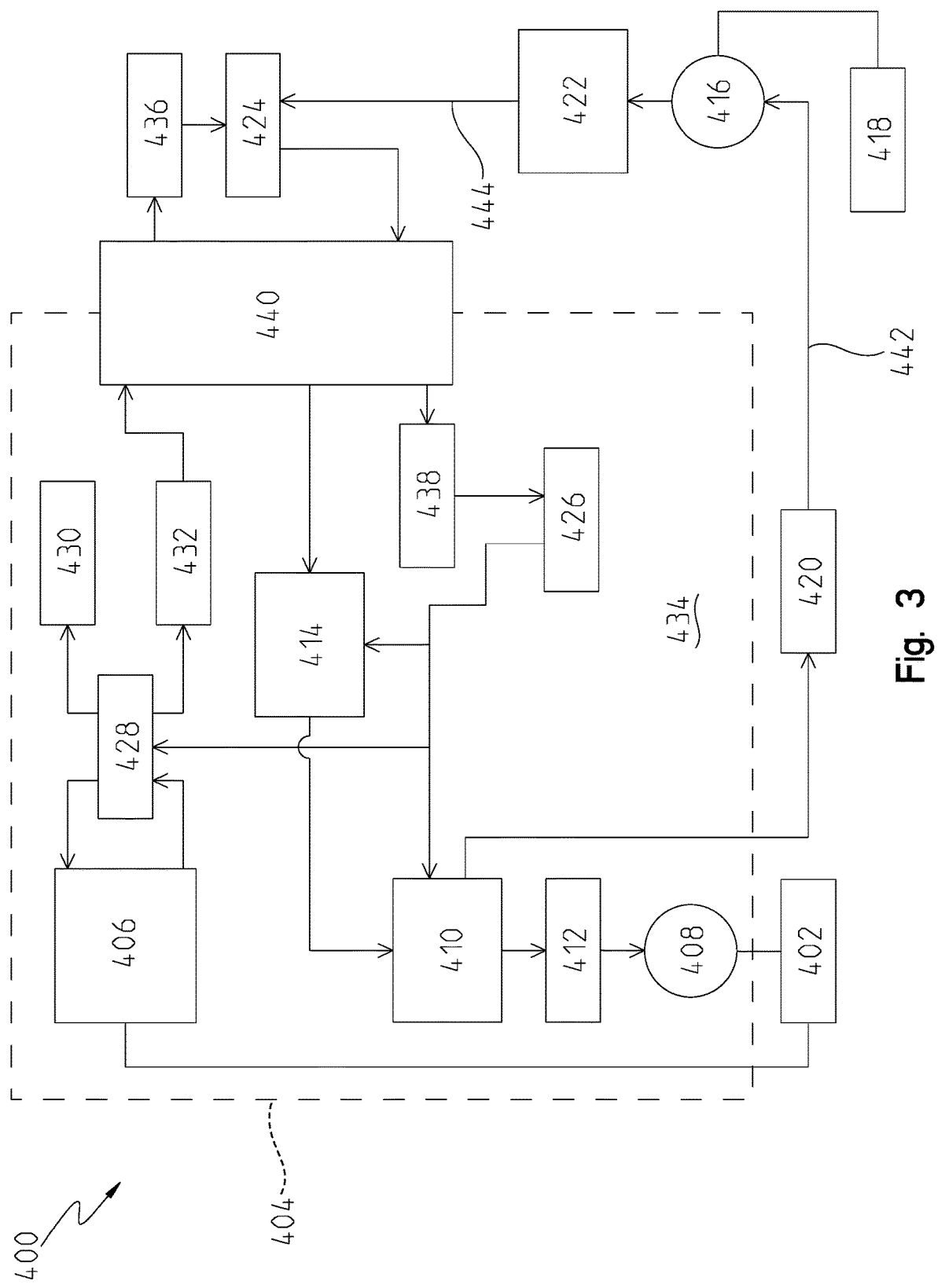
FIG. 3 is a second exemplary block diagram and schematic view of a lube circuit for a transmission.

Fluid flow through the lube circuit can also pass through the lube regulator valve 326 and be directed to converter flow valve 328. Here, fluid passing through the converter flow valve 328 can be directed into the torque converter 306. Fluid can collect in the converter in a manner in which the converter 306 functions as an accumulator. In this configuration, the torque converter 306 can further stabilize the system 300 to reduce noise from the pump 316. As fluid passes through the torque converter 306, it is redirected back through the converter flow valve 328. Fluid that exits the torque converter 306 and is directed through the converter flow valve 328 can be directed to a main regulator valve 330 that regulates the transmission main circuit. An alternative path through the converter flow valve 328 can direct fluid through a converter relief/regulator valve 332. Fluid can pass through the converter relief/regulator valve 332 and exit the transmission 304 before passing through a cooler 336. As fluid passes through the cooler 336, it returns into the transmission 304 and passes through a cooler circuit filter 338. As shown in FIG. 3, the pressure tap 324 is configured such that fluid is pumped from the external pump 316 into the transmission 304 and enters the lube circuit after the cooler circuit filter 338.

As also shown in FIG. 2, the lube regulator valve 326 can also regulate fluid passing through an electro-hydraulic system 314 of the transmission 304. The electro-hydraulic system 314 forms part of the lube circuit and includes shafts, clutches, bearings, washers, and the like. Here, fluid can be spread or distributed about the electro-hydraulic system 314 to provide adequate lubrication to those parts of the transmission that can be damaged without lubrication. As shown, fluid can be directed to the electro-hydraulic system 314 and returned to the transmission sump 310. For instance, fluid may be thrown or sprayed to substantially lubricate rotating shafts or clutches. As the fluid covers or coats the components of the electro-hydraulic system 314, the fluid flows or drips back towards the transmission sump 310 and recirculates throughout the transmission 304. In particular, as the fluid returns to the sump 310, it can then be suctioned back through the second lube portion and pumped back into the transmission 304 by the external pump 316.

As further shown in FIG. 2, fluid that exits the cooler 336 may also be directed to the electro-hydraulic system 314. In alternative embodiments, fluid can be directed to and from the electro-hydraulic system 314 through different paths not shown in FIG. 2. In this way, FIG. 2 only represents one example of the present disclosure. In addition, one or more of the flow paths described above may not see sufficient flow pressure to open or close a valve. For instance, fluid passing through the converter relief/regulator valve 332 may not open so that fluid can flow therethrough and to the cooler 336. In this configuration, the valve 332 may be "deadheaded" to prevent flow through the valve. In any case, if the fluid flow is blocked by the main regulator valve 330 and converter relief/regulator valve 332, a substantial amount of fluid passing through the lube regulator valve 326 will be directed either to sump 310 or the electro-hydraulic system 314.

Turning to FIG. 3, another exemplary embodiment of a transmission lube circuit is illustrated. Many of the features illustrated in the embodiment of FIG. 2 are also shown in FIG. 3. A transmission lube system 400 includes a transmission 404 and an engine or drive unit 402. The engine or drive unit 402 can transfer power to a torque converter 406 as shown. In addition, the engine or drive unit 402 can drive an internal pump 408. The internal pump 408 is disposed on an interior 434 of the transmission 404. The boundary between the interior 434 and exterior of the transmission 404 is shown as a dash line.

The pump 408 includes an inlet side and outlet side. The inlet side of the pump 408 is fluidly coupled with a transmission sump 410, which as described above is a fluid source for the internal pump 408. The transmission sump 410 can be configured as a conventional oil pan disposed near the bottom of the transmission 404. In any case, the sump 410 is adapted to receive and collect fluid as the fluid passes through the transmission 404. Fluid can be suctioned from the sump 410 to the pump 408 by passing the fluid through a filter 412 to remove any contaminants from the fluid. The internal pump 408 can then pressurize the fluid and distribute it to the transmission main circuit, lube circuit, torque converter 406, and cooler 436 as required.

Similar to FIG. 2, however, if the engine or drive unit 402 is not operating, the internal pump 408 cannot build fluid pressure and provide fluid to any of the fluid circuits in the transmission 404. Therefore, an external pump 416 is provided that forms the basis of an external portion of the transmission lube circuit. Here, the external pump 416 can be fluidly coupled to the transmission sump 410 as shown in FIG. 3 via a first flow line 442. A filter 420, e.g., a 100 μm screen filter, may be disposed in the suction line of the circuit between the sump 410 and inlet side of the external pump 416.

The external pump 416 can be powered by an electric motor 418 as shown in FIG. 3. The external pump 416 can also be hydraulic, mechanical or other known type of pump. The external pump 416 and internal pump 408 can operate simultaneously or independently, depending on the application. The needs of a particular application can be tailored by using either the internal pump 408 or external pump 416 as necessary.

A check valve 422 or other valving means can be disposed on the outlet side of the external pump 416 to prevent fluid from flowing in a reverse direction via a second flow line 444 towards the pump outlet. Unlike the embodiment of FIG. 2, the illustrated embodiment of FIG. 3 can include a manifold 440 coupled to the transmission 404. The manifold 440 can be coupled to either a front end or rear end of the transmission 404 for different embodiments. Alternatively, the manifold 440 may be coupled to a side portion of the transmission 404. Advantageously, the manifold 440 is configured to be disposed near a flow channel in the lube circuit so the manifold 440 is in fluid communication with the lube circuit.

The manifold 440 can be fluidly coupled to a vehicle cooler or other cooling mechanism 436 as shown in FIG. 3 such that fluid passing through the transmission 404 can be directed through the cooler 436 to reduce the temperature thereof. A pressure tap or fitting 424 may be defined or coupled to the manifold 440 to allow fluid from either the cooler 436 or external pump 416 to be directed into the lube circuit of the transmission 404. For example, fluid may be pumped via the external pump 416 through the second flow line 444 to the pressure tap or fitting 424.

Adjacent to the manifold 440, and fluidly coupled thereto, is a cooler circuit filter 438 that screens fluid passing into the transmission 404 from the cooler 436. Here, fluid being pumped by the external pump 416 into the transmission 404 enters the lube circuit before the cooler circuit filter 438 and thus contaminants can be filtered a second time (i.e., the first filtering step done by filter 420). As fluid passes through the filter 438, it is directed to a lube regulator valve 426, which functions similar to the lube regulator valve 326 of FIG. 3.

The lube regulator valve 426 can regulate fluid passing through an electro-hydraulic system 414 of the transmission 404. The electro-hydraulic system 414 forms part of the lube circuit and includes shafts, clutches, bearings, washers, and the like. Here, fluid can be spread or distributed about the electro-hydraulic system 414 to provide adequate lubrication to those parts of the transmission that can be damaged without lubrication. As shown, fluid can be directed to the electro-hydraulic system 414 and returned to the transmission sump 410. For instance, fluid may be thrown or sprayed to substantially lubricate rotating shafts or clutches. As the fluid covers or coats the components of the electro-hydraulic system 414, the fluid flows back towards the transmission sump 410 and recirculates throughout the transmission 404. In particular, as the fluid returns to the sump 410, it can then be suctioned back through the external portion of the lube circuit and pumped back into the transmission 404 by the external pump 416.

Fluid can also be directed by the lube regulator valve 426 to a converter flow valve 428 which regulates fluid flow to and from the torque converter 406. The torque converter 406 can serve as an accumulator of fluid that stabilizes the overall system due to noise from the external portion of the lube circuit (e.g., the pump 416 and motor 418 may create pulsations throughout the system 400). Fluid can pass through the converter flow valve 428 and be directed to the torque converter 404, a main regulator valve 430 or converter relief/regulator valve 432. In the configuration of FIG. 3, the main regulator valve 430 blocks fluid flow therethrough, but in other embodiments the main regulator valve 430 can regulator fluid flow through the transmission's main pressure circuit.

The converter relief/regulator valve 432 can regulate fluid flow to the cooler 436. In the embodiment of FIG. 3, fluid can pass through the valve 432 and manifold 440 before reaching the cooler 436. Other embodiments may not require the fluid to flow through the manifold 440, but rather a pressure tap may be disposed between the valve 432 and cooler 436. Other means for fluidly coupling the lube regulator valve 426 to the cooler 436 can be achieved as well, including establishing a direct fluid path therebetween. In an alternative embodiment, the converter relief/regulator valve 432 may block or prevent fluid flow from reaching the cooler 436. In this instance, a different flow path may be provided so that fluid can be directed through the cooler 436.

In some embodiments, the lube regulator valve 426 can direct excess fluid to the transmission sump 410. This may be necessary if the fluid pressure exceeds a threshold limit of the lube regulator valve 426. In this manner, fluid is returned to the sump 410 so that it can be recirculated through the transmission 404.

In an embodiment in which the transmission includes a dipstick opening, it may be desirable to couple the external lube circuit to the transmission closest to this opening. This assumes the lube circuit can be fluidly coupled at an end closest to the opening. In doing so, the least amount of plumbing hardware (i.e., fittings, tubing, etc.) may be required to make the fluid connection. It may also be desirable to tap into the lube circuit at a location where the external pump can be mounted or coupled to the transmission. This too may reduce the overall length of tubing and amount of hardware required to achieve the external lube circuit. In the case where an external manifold is used, the size and shape of the manifold may determine where the external lube circuit fluidly couples with the internal lube circuit.

A benefit of the present disclosure is the ability to utilize the preexisting internal lube circuit of the transmission and add an external lube circuit thereto to achieve desired functionality of the system. Additionally, the transmission may be utilized in other applications that previously were not achievable, undesirable, or unknown. For instance, with one of the embodiments disclosed herein, a transmission can be towed without disconnecting a driveline. With the external lube circuit driving lubrication of the internal transmission components, potential damage that otherwise would certainly occur is avoided. Moreover, locomotives and other powered vehicles can include a transmission with the external lube circuit for various applications that otherwise were unknown. Other advantages and results are obtainable by operating either or both the internal and external pumps simultaneously or alternately.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A vehicle transmission comprising:
 a housing;
 an electro-hydraulic system located within said housing;
 a sump disposed near a bottom of said housing;
 an internal pump located within said housing and having an inlet fluidically connected to said sump for pumping fluid therefrom;
 a manifold mounted on said housing and having a plurality of inlets and outlets that permit fluid flow into and out of said housing;
 an external pump located externally of, and mounted on, said housing and having an inlet in fluid communication with said sump for receiving fluid from said sump and an outlet fluidically connected to an inlet of said manifold by a fitting for returning fluid into said housing;
 a check valve fluidically interposed between the outlet of said external pump and said fitting;
 an internal filter located within said housing and fluidically connected to said manifold for receiving fluid from said manifold;
 a lube regulator valve fluidically connected to said internal filter for receiving fluid therefrom;
 a bifurcated fluid path for receiving fluid from said lube regulator valve and returning a portion to the sump and a portion to said electro-hydraulic system; and
 a direct fluid path for returning fluid from said manifold directly to said electro-hydraulic system;
 wherein, the external pump and the internal pump are capable of simultaneous or independent operation.

2. The transmission of claim 1 further comprising an external filter disposed outside of said housing and fluidically interposed between said sump and said external pump.

3. The transmission of claim 1 further comprising an electric motor powering said external pump.

4. The transmission of claim 1 further comprising a cooling mechanism receiving fluid from manifold and returning cooled fluid through fitting for return to the interior of said transmission through said manifold.

5. The transmission of claim 1 wherein the external pump is mounted on said housing with a bracket.

6. The transmission of claim 1 wherein said fitting comprises a pressure tap.

7. The transmission of claim 1 further comprising a filter fluidically interposed between said sump and internal pump.

8. The transmission of claim 1 further comprising a drive unit for driving said internal pump.

9. The transmission of claim 1 further comprising a torque converter.

10. The transmission of claim 9 wherein said internal pump pumps fluid to said torque converter.

11. The transmission of claim 9 further comprising a converter flow valve that directs fluid to the torque converter.

12. The transmission of claim 9 further comprising a main regulator valve and converter relief/regulator valve fluidically connected to said converter flow valve.

13. The transmission of claim 1 wherein fluid from the electro-hydraulic system is returned to the transmission sump.

14. The transmission of claim 1 further comprising a planetary gear system having a number of automatically selected gears.

* * * * *